April 26, 1938.　　　G. TAUSCHEK　　　2,115,563
READING MACHINE
Filed July 27, 1932　　　6 Sheets-Sheet 1

FIG.1.

INVENTOR
Gustav Tauschek

April 26, 1938.　　　G. TAUSCHEK　　　2,115,563
READING MACHINE
Filed July 27, 1932　　　6 Sheets-Sheet 2

INVENTOR
Gustav Tauschek

April 26, 1938. G. TAUSCHEK 2,115,563
READING MACHINE
Filed July 27, 1932 6 Sheets-Sheet 5

INVENTOR
Gustav Tauschek

April 26, 1938.  G. TAUSCHEK  2,115,563

READING MACHINE

Filed July 27, 1932   6 Sheets-Sheet 6

INVENTOR

Gustav Tauschek

Patented Apr. 26, 1938

2,115,563

UNITED STATES PATENT OFFICE 2,115,563

READING MACHINE

Gustav Tauschek, Weidling, near Vienna, Austria

Application July 27, 1932, Serial No. 624,984

6 Claims. (Cl. 235—61.6)

This invention relates to controllers and has for its principal object the provision of a mechanism for analyzing by rays of radiant energy one or a plurality of characters, such as Arabic numerals, alphabetical characters, or any arbitrary characters, in order that suitable manifesting operations may be controlled directly by the characters themselves.

The determination of the character which causes it to be significant among a series is effected by apparatus which determines by the assistance of light or other rays the particular outline or configuration which makes it conform to one of a series. Upon the presence of such individual identity the desired controlling effects may be initiated.

To illustrate the application of the improved apparatus the characters to be read comprise Arabic numerals which are represented on a record by a light modifying substance, although other forms of representations are contemplated. The digit is compared by means of light rays with a series of digits provided on a film, for example. By having the digit on the record opaque, and on the film translucent, when the correlation of like digits is provided, the identity is registered or recorded under the control of suitable light responsive devices such as a photoelectric cell. The latter preferably causes the transmission of an electric impulse, and a series of such impulses are effected dependent upon which one of the characters in the series effects the identity.

Where a plurality of digits comprise a number the digital value thereof is derived by the method of analysis just explained and by suitable selecting means the digits, or characters are represented on a plurality of correlated manifesting devices, for the purpose of indication, accumulation, printing, etc.

It is therefore the principal object of the present invention to provide an improved mechanism for reading by means of rays of radiant energy the characters on records.

It is a more specific object to effect such reading by employing light rays to compare a series of characters with the characters to be read.

It is further an object to compare each of a plurality of characters with each different character of a series to thereby read complete words, numbers and the like.

It is a still further object to effect the reading by means of rays of radiant energy in a successive manner.

Further objects, in connection with reading a plurality of characters is to determine the digital value of such characters, where the latter may take the form of Arabic numerals and thereby control differential effects upon accumulating elements, although such effects may be employed to adjust printing elements even though the characters are numerals, letters of the alphabet, etc., or even punctuation, mathematical, or other marks or signs.

It is a further object to provide for the reading by rays of radiant energy by causing the image of one or more characters of a series to be compared directly with each of the characters on a member, such as a film.

It is specifically an object to devise an apparatus for comparing by the method described which permits the use of a single ray sensitive cell.

Further and other objects consist in the provision of establishing a sufficient length of time for effecting absolute comparison of characters, novel structural arrangements which tend to simplify the machine and in general to make the machine highly efficient for the purposes for which it is devised.

Other and subordinate objects will be evident as the description progresses.

In the accompanying drawings:—

Figure 1:
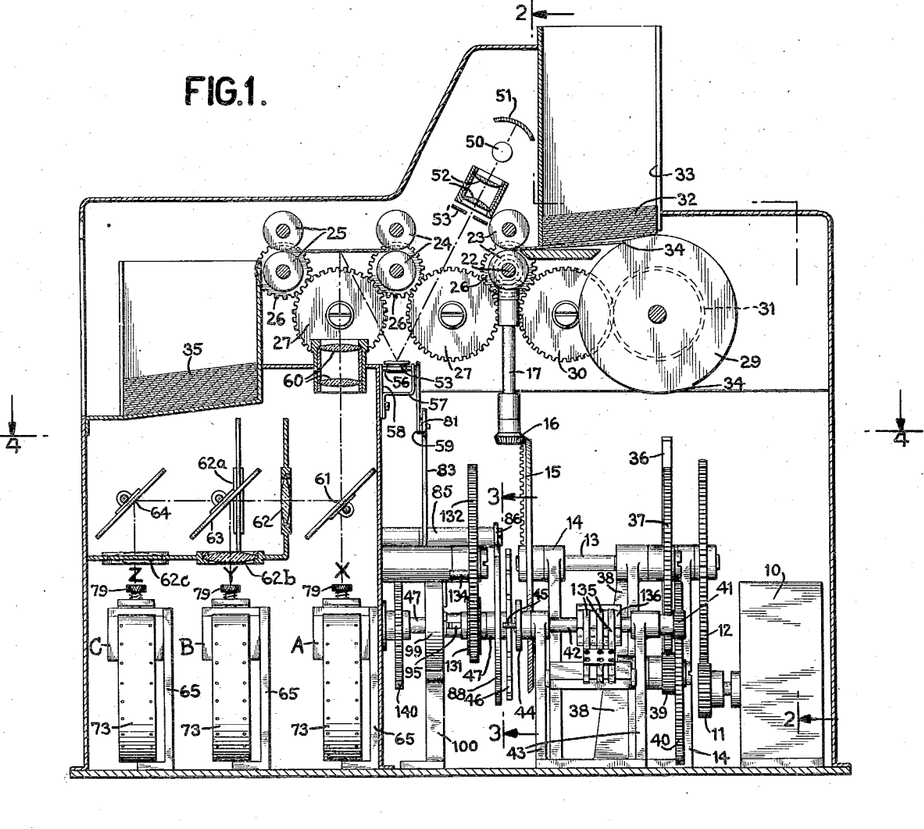
Fig. 1 is a sectional view of the illustrative machine embodying the present improvements.
Figure 2:
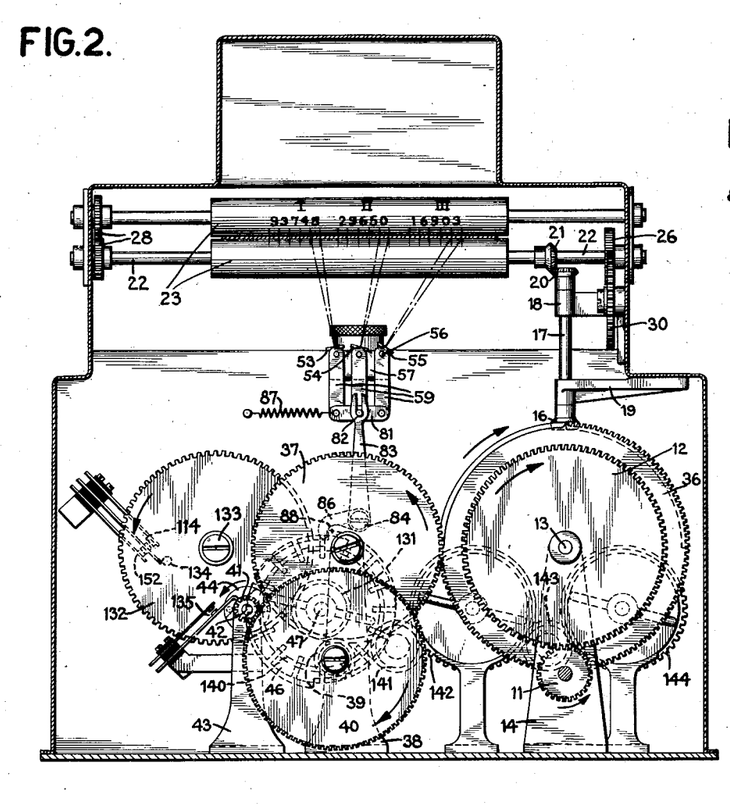
Fig. 2 is a sectional view taken on the line 2—2 of Fig. 1.

The motive power for driving the mechanical parts of the machine is derived from a motor 10 (Figs. 1 and 4) which through a pinion 11 is adapted to drive a gear 12 secured to a power shaft 13 which is journalled in a standard 14 secured to the machine base. To one end of shaft 13 there is secured a mutilated bevel gear 15 in mesh with a bevel pinion 16 secured to a vertical shaft 17. The latter is journalled in a pair of brackets 18 and 19 (Fig. 2) and one end of shaft 17 carries a bevel pinion 20 in mesh with a similar bevel pinion 21, the latter being secured to a shaft 22. By means of the shaft 22 three pairs of feeding rollers 23, 24 and 25 are driven. (Fig. 1.) To one end of the shaft of each lower feeding roller of a pair there is secured a pinion 26 (Fig. 1) and by means of two intermeshing gears 27 a driving connection from the pinion 26 on shaft 22 is effected. As best shown in Fig. 2, by way of example for the pair of feeding rollers 23, intermeshing pinions 28 are provided for simultaneously driving the feeding rollers of each pair in opposite directions.

From the shaft 22 there is a driving connection to a record feeding cam 29 (Fig. 1) and such connection comprises a gear 30 in mesh with the gear 26 secured to the drive shaft 22. Gear 30 is adapted to drive a gear 31 secured to the cam 29.

The records 32 to be analyzed are placed in a receptacle 33 with the numbers thereon face down and drop by gravity so that the rearmost edge of the bottom record coacts with one of a pair of shoulders 34 of cam 29. As the cam turns, the shoulder shifts a record out from the receptacle through a suitable slot to the first pair of feeding rollers 23 which then feed the record to the feeding rollers 24 during the first quarter of a machine cycle. When a record is between the pairs of rollers 24 and 25 the teeth of gear 15 pass out of cooperation with the teeth of bevel pinion 16, and as the feeding action of the rollers now stops, the record to be analyzed will be held by pairs of rollers 24 and 25.

While the gear 15 continues to rotate without feeding the record the record analyzing operation will be effected. As the next cycle of machine operation is effected the previously analyzed record will be fed by rollers 25 to a storage receptacle 35 and during this machine operation a succeeeding record will be fed to the analyzing position.

To the power shaft 13 there is secured a mutilated gear 36 (Fig. 2) having a sufficient number of teeth on its periphery to give a gear 37 a complete revolution during the last three quarters of a machine cycle. The gear 37 is carried by a standard 38 (Fig. 4) and meshes with a pinion 39 rotatably carried by the standard 38 and attached to pinion 39 is a gear 40 meshing with a pinion 41. The gearing 37, 39, 40 and 41 is so proportioned that for each revolution of gear 37 the pinion 41 is given forty revolutions.

Figure 4:
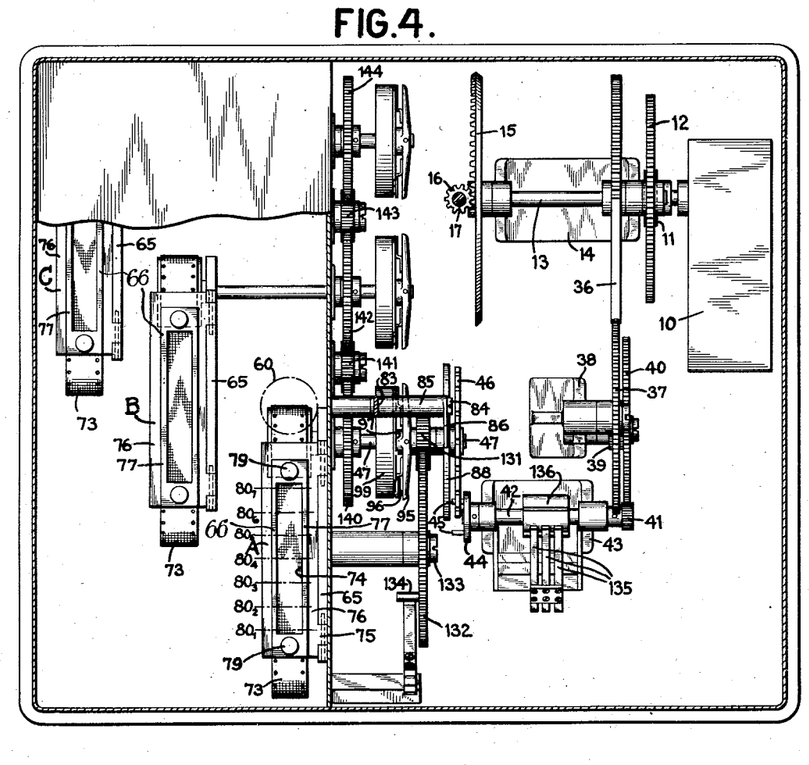
Fig. 4 is a plan view of the machine taken on the line 4—4 of Fig. 1, a portion of a shield having been removed to more clearly show certain interior parts.
Figure 7:
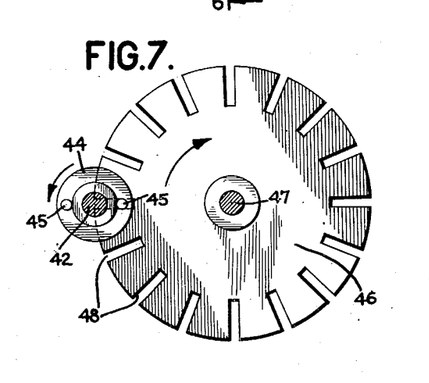
Fig. 7 is a view in side elevation of the intermittent driving mechanism for feeding one of the films.

The gear 41, as best shown in Fig. 4, is attached to one end of a shaft 42 journalled in a standard 43 and the other end of shaft 42 has secured thereto a disk 44 carrying diametrically arranged pins 45 (see also Fig. 7). The pins 45 extend into the plane of a disk 46 secured to a shaft 47 and the disk has a series of 16 radial slots 48 in which the pins 45 alternately engage so that during each machine cycle the disk 46 and, therefore, shaft 47 is driven five revolutions.

Figures 14, 15, 16, 17:
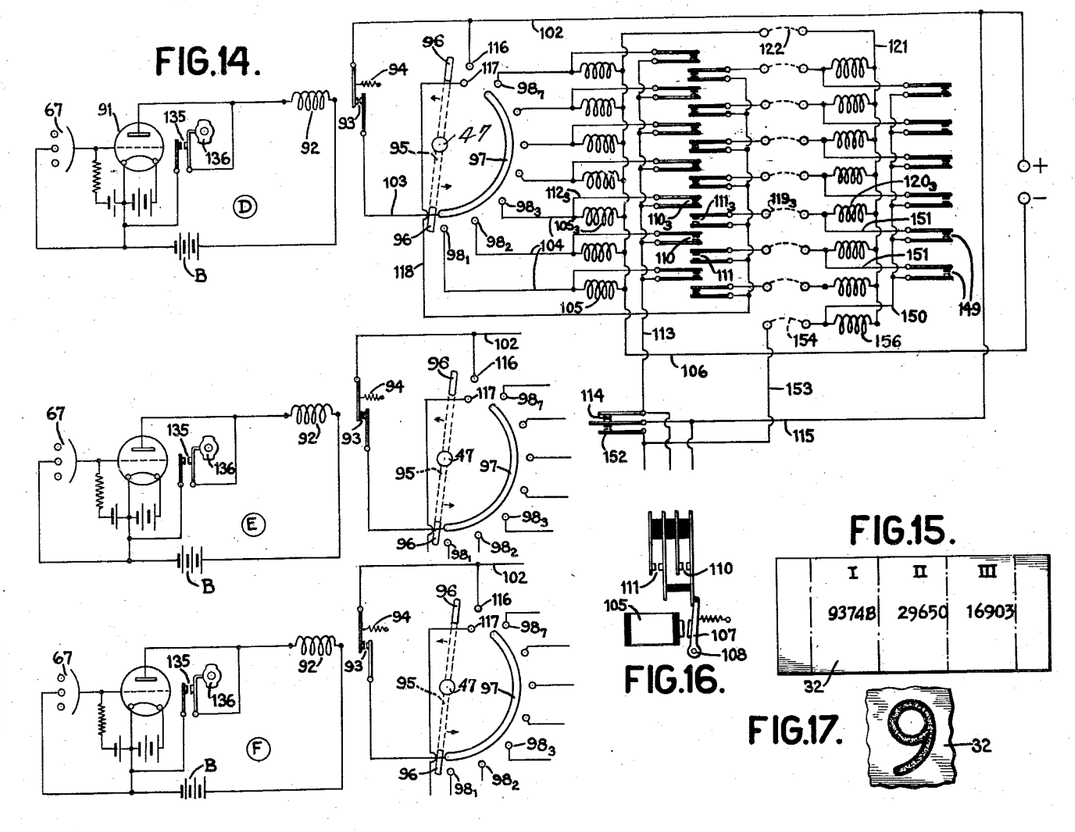
Fig. 14 is a preferred electric wiring diagram shown complete for one of the units.
Fig. 15 is a concrete example of one of the records disclosing several numbers capable of being read by the light controlled devices of the present machine so that the numerical values represented by each number may be entered in a related accumulator.
Fig. 16 is a view in elevation of one of the relay magnets and associated contacts.
Fig. 17 is an illustration of a magnified typed character.

Reverting now to the records containing the numbers to be accumulated it will be observed that in Fig. 15 one of such records 32 is illustrated, and is divided, for example, in three fields, I, II and III, each in practice preferably of a width capable of receiving seven digits comprising a number involving a corresponding number of denominational orders, although numbers of only five orders are shown for illustrative purposes. The digits of the numbers are applied to the record preferably by a typewriter, or some suitable printing apparatus, so that uniformity in representation may be secured, for reasons that will be obvious later. The numbers represented by the three fields are read and entered in a corresponding number of accumulators by reading means now to be described. As stated, the records 32 (Fig. 1) having the numbers to be read are fed with the numerals facing downward or towards the base of the machine.

In Fig. 1 numeral 50 designates a source of light which is reflected by a reflector 51 so that beams of light are projected by a pair of suitable optical lenses 52 so that a narrow beam of light is projected by a slit of a disk 53'. This beam of light is projected so that it falls upon three mirrors 53, 54 and 55 (see Figs. 1 and 2). As best shown for mirror 53, in Fig. 1, the mirrors are secured to pivot pins 56 which are journalled in a bracket plate 57 and a plate 58 and each pivot pin 56 has secured thereto a link 59 (see Figs. 1 and 2). The mirrors 53, 54 and 55 are fixed on their respective pivot pins 56 at different angles so that the light is reflected from the mirrors at different angles to the bottom face of the record 32 having the numbers thereon. In the normal position of the three mirrors, each of them reflects a beam of light having a width equal to the maximum width of a digit, in such a way as to illuminate, in the respective field I, II, or III, the area covered by the digit of the seventh order in that field. This area is the one farthest to the left in each field, in Figs. 2 and 15. From this normal position, the three mirrors are swung gradually (clockwise in Fig. 2) until they reach the extreme position illustrated by Fig. 2, in which the beams of light reflected by said mirrors illuminate, in each of the fields I, II, and III, the area covered by the digit of the first order in that field, that is, the area farthest to the right in each field, in Figs. 2 and 15. In the particular case illustrated, the three mirrors will, in the position illustrated by Fig. 2, illuminate the digit 8 in field I, the digit 0 in field II, and the digit 3 in field III respectively. It will be understood that the movements of the three mirrors are timed in such a way that at each particular moment the mirrors will illuminate areas of like relative position or "order" in the respective fields of the record card 32. As the face of the card is white and therefore has good reflecting properties, an image of the digit or digits appearing in any of the three illuminated areas of the record card (or rather an image of the white portion of said area which contains such digit) will be gathered by a lens or lens system 60 wide enough to cover the three fields I, II, III. The optical image of the digit illuminated by the mirror 53 (the digit 8 in Fig. 2) will be transmitted directly downward to a point X, it being understood that each of the images is inverted by lens refraction in the lens system 60. The optical images of the digits illuminated by the mirrors 54 and 55 (the digits 0 and 3 respectively in Fig. 2) are transmitted downwardly, in two paths to one side of path of the image of the first-mentioned digit (8), and will be caught by a mirror 61, wide enough to cross said two paths, but clear of the path directed to the point X. The mirror 61 will re-invert or reverse, by reflection, the optical images of the digits illuminated by the mirrors 54, 55 and previously inverted by the lens system 60. The optical image of the digit illuminated by the mirror 54 is directed by the mirror 61 through a lens 62, which again inverts the image by refraction, on to another mirror 63, which again reverses the image by reflection and directs it, through a lens 62b effecting a further reversal by refraction, to the point Y. The optical image of the digit illuminated by the mirror 55 is directed by the mirror 61 through a lens 62a, which again inverts such image by refraction, on to another mirror 64, which again reverses the image by reflection and directs it, through a lens 62c effecting a further reversal by refraction, to the point Z. It will be noted that the images are of the same character (inverted) at the three points X, Y, Z; this is due to the number of reversals between the record card 32 and the said points X, Y, Z being properly selected to obtain this effect. In the particular case illustrated, the number of reversals is odd for each of the three images, there being a single reversal (in the lens system 60) for the image reaching the point X, while there are five reversals for each of the images reaching the points Y and Z respectively, namely, a first reversal in the lens system 60; a second reversal at the mirror 61; a third reversal in the lens 62 or 62a respectively; a fourth reversal at the mirror 63 or 64 respectively; and a fifth reversal in the lens 62b or 62c respectively.

Referring now to Fig. 7 it will be recalled that shaft 42 is given forty revolutions for each machine cycle and pins 45 engaging the slots 48 of disk 46 successively constitute, as is well known, an intermittent drive movement for the shaft 47 which is driven five complete revolutions for each machine cycle. The motion imparted to the shaft 47 by a pin 45 is a variable motion the speed of which is at a maximum when such pin is at the inner portion of the slot 48 and at a minimum (zero) at the moment when one pin 45 is just leaving a slot 48 and the other pin 45 is just entering the next slot 48. At this moment the disk 46 and shaft 47 will be stationary, so that their motion or drive may be termed intermittent.

Figure 5:
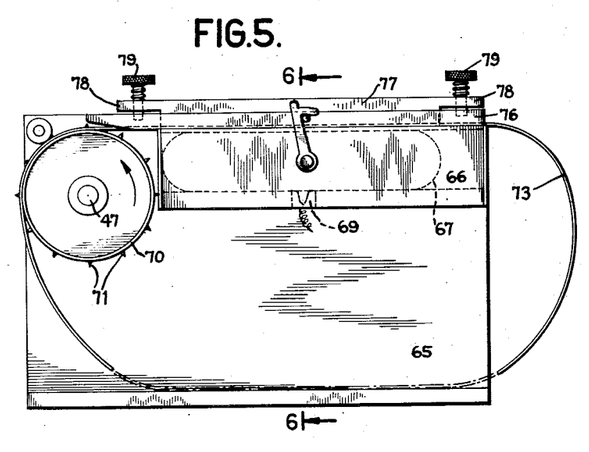
Fig. 5 is a view in side elevation of one of the film driving units.
Figure 6:
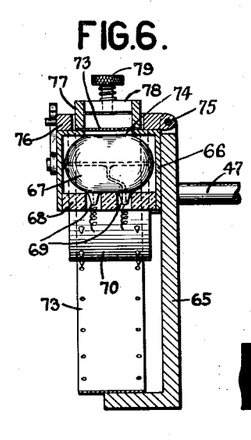
Fig. 6 is a sectional view taken on the line 6—6 of Fig. 5.

As shown in Fig. 4, three reading units A, B, C are provided, which are of like construction, illustrated in Figs. 5 and 6 with respect to the unit A. To a bracket 65 secured to the base of the machine there is attached a square tube 66 which is closed at both ends and in which is fitted a photo-electric cell 67 resting upon a base 68 which has suitable apertures 69 for permitting electrical connections to the photo-electric cell.

Mounted in the bracket 65 of the unit A is one end of the shaft 47 which carries a sprocket wheel 70. The latter is provided on its periphery with a double set of film driving projections 71 which are equi-distantly spaced to receive similarly spaced holes 72 of a negative film 73. The film 73 is an endless belt and a portion thereof passes over an elongated aperture 74 formed in the upper horizontal plate of the tube 66.

By means of pins 75 an apertured cover 76 is hinged in the bracket 65 and fitting within the aperture of cover 76 is a guide member 77 having ears 78 (Fig. 5) in which are threaded adjusting screws 79 which screw into end portions of the cover 76. From Fig. 6 it will be apparent that the lower horizontal surfaces of the vertical portions of member 77 rest against the top surface of the film 73 so that by adjusting the screws 79 the film is forced to rest flat against the top surface of the horizontal plate of tube 66 although providing the necessary freedom of movement of film 73 in its feeding movement. It will be observed that the aperture 74 of the tube is in registration with a similar aperture of cover 76 and guide member 77. The opening provided is sufficiently long to employ almost the entire effective portion of the photo-electric cell 67, the reason for the necessary length being obvious as the description proceeds. It will be noted that the direction in which the upper runs or active portions of the films 73 move to enter the path of the rays of light or other radiant energy, is transverse to the direction in which the cards or records 32 move to enter the rays or beam of radiant energy.

Figure 11:
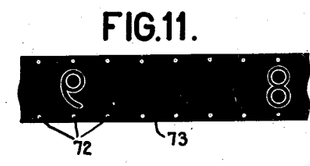
Fig. 11 is a plan view of a portion of one of the films employed in the light controlled reading devices.

Equi-distantly separated on the film belt 73 are a series of digits to be compared with the characters on the record 32, such film constituting a search plate. For illustrative purposes digits on a record are to be read and the film 73, which is a negative, is provided with all the digits. If letters on a record are to be read the characters on the film 73 will comprise a complete alphabet. Two of such digits "9" and "8" are shown in Fig. 11 and are demarcated by white lines enclosing an opaque surface similar to the body of the film 73. As only the white lines are transparent or translucent, that is, pervious to light, light will be transmitted so as to produce by light beams on a screen or other projection surface the outline of the digit, letter, or whichever character is to be read. The diameter of the sprocket drum 70 is of such dimension that a half revolution thereof, by a corresponding movement of shaft 47, shifts the film 73 an amount sufficient to bring a different digit to a particular reading line. There are seven such reading lines 80 as shown by dash dot lines 80₁—80₇ crossing the aperture 74 in Fig. 4 and sub-scripts hereafter designate denominational orders. If the digit "9", for example, is to be successively compared with the digits 16903, composing the number in field I, during half a revolution of shaft 47 such digit is shifted successively to the seven reading lines 80, and in general, a digit on the film 73 is successively positioned to all the seven reading lines 80 before the succeeding digit comes into view in the aperture 74 for successive positioning on the reading lines 80. The distance between two successive characters on a film or comparison member 73 (such as the characters 8 and 9 in Fig. 11) is at least equal to the distance covered by the images of the columns (and the character therein) on the record 32 as projected on the said film.

Referring now to Fig. 2 it will be observed that the mirror 55 related to field III, by virtue of its shifted angular position, illuminates the digit of the units order. The normal angular position for mirror 55, as well as the other mirrors 53 and 54, which normally illuminate the areas for the digits of the seventh order, is maintained by the following construction. A cross member 81 is connected to the lower end of each depending arm 59 and a pin 82 carried by cross member 81 is received by an open slot of an arm 83 which is loosely mounted on a stationary stud 84 said arm being secured to a sleeve 85 overlying said stud. Secured to sleeve 85 is an arm 86 which is urged by a spring 87 connected to the cross member so as to constantly engage the periphery of a profile cam 88 which is secured to the shaft 47.

Figure 3:
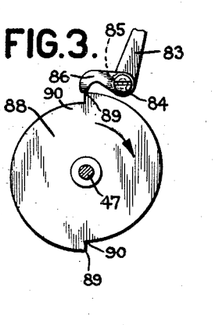
Fig. 3 is a sectional view of one of the controlling cams taken on the line 3—3 of Fig. 1.

The arm 86 normally engages one of a pair of the high portions 89 of the cam 88, as shown in Fig. 3, positioning each mirror 53, 54, 55, so that it illuminates the digit in the seventh (millions) order. Upon an initial rotation of cam 88 in the arrow direction in Fig. 3 the arm 86 is urged so that the tip of the curved part of arm 86 drops from one of the high parts 89 to one of the low parts 90. During the quick swing of the mirrors 53, 54, 55 (clockwise in Fig. 2) produced by the sudden drop of the arm 86, the beams of light reflected by said mirrors will sweep rapidly over each of the fields I, II, III respectively, from left to right, that is to say, from the space assigned to digits of the highest order or denomination (millions, in the particular example illustrated), to the space assigned to digits of the lowest order or denomination (units, in the particular embodiment shown). In the field III, the digits shown in Fig. 15 will therefore be illuminated by the mirror 55 successively in the order 1, 6, 9, 0, 3, during the quick sweep of this mirror which is produced by the drop of the arm 86. Immediately before said drop, when the arm 86 is in the initial or normal position indicated in Fig. 3, the light beams reflected by the mirrors are directed to the seventh (millions) space of each of the fields and produce an optical image of any digit found in such space, at the reading line $80_7$ (Fig. 4). During the quick sweep of the mirrors, the light beams produce images of any digits found in the other spaces of the fields, at the lines $80_6$, $80_5$, $80_4$, $80_3$, $80_2$ and $80_1$ in quick succession, and this operation simply brings the parts into position for the examination of the lowest denomination (unit) digits in the position corresponding to the reading line $80_1$. With respect to the field III, when the mirror 55 has been shifted in the manner just described the image of the digit "3" will be positioned at the line $80_1$ in Fig. 4. The slight rotation of shaft 47 necessary to cause an optical image of the digit "3" at the reading line $80_1$ also turns the film drive wheel 70 a sufficient extent so that the first digit on the film 73 is brought to the reading line $80_1$. This first digit is the digit "9". Hence at such line the optical image of the digit "3" will be superimposed upon the digit "9". Since light reflected by the white space of the card surrounding the digit "3" is reflected to the translucent lines demarcating the digit "9", and since the digit "9" of the film 73 will not be completely covered by the digit "3" of the card 32, light will be transmitted to the photo-electric cell, but this light will not produce an effect indicating identity of the digit on the film with the digit on the card, as will be obvious as the description progresses. It is also to be understood that the part of the film between the digits therein provided prevents any light reflected by the white surface of the card being transmitted to the photo-electric cell due to the opaque properties of the film 73.

As the cam 88 turns through a half-revolution during which its spiral portion gradually lifts the arm 86 from a low point of the cam to a high point thereof, it simultaneously shifts the mirrors 53, 54 and 55 to co-operative relation with the successive reading lines, so that after the mirror 55, for example, produces an optical image of the digit "3" at the reading line $80_1$, it is shifted by cam 88 to project the optical image of the digit "0" at the reading line $80_2$, next the digit "9" at the reading line $80_3$, and so on. When the light beam reflected by the mirror is shifted from one reading line to the other during the half-revolution that the end of the arm 86 rides on one of the circumferential portions of the cam 88, the digit on the film used for comparison is correspondingly shifted. Therefore, with respect to the digit "9" of the film, the latter is successively compared with the optical image of each digit composing a number. When the digit "9" of the film is at the reading line $80_3$ it is superimposed by the optical image of the digit "9" in the hundreds order of the field III. As the type fonts of the digits of the records and film are alike and the optical system is arranged to project a record digit image of the same size as the film digit, the imposition of the digit to be read upon the digit to be compared therewith, causes, in general, a complete darkening of the photo-electric cell 67 with a significant effect now to be described.

After a half-revolution of the cam 88, the tip of arm 86 drops again to one of the low parts of the cam, and this causes the mirrors 53, 54, 55 to swing quickly back to the position in which they throw images at the reading lines $80_1$; at the same time, the films 73 are advanced to bring the next digit of the film into operative position for comparison with the successive digits on the card or record 32 as the mirrors swing about their pivots 56 in the opposite direction with a relatively slow motion during the time that the end of the arm 86 rides on the other circumferential portion of the cam 88.

Referring now to Fig. 14 it will be observed that for the light controlled reading units A, B and C there are provided electric control units D, E and F, respectively and only the control unit D for unit A is shown completely and will be described in detail in view of the general similarities with the others. With respect to unit D, there is provided a vacuum tube 91 connected electrically in the usual manner so that a constant potential is normally applied to a magnet 92 of a relay, said magnet being in series connection with the plate of the vacuum tube 91. The contacts 93 of the relay are opened when this constant potential is applied, but when the potential is reduced, a spring 94 causes the closure of said contacts 93. The elements of the photo-electric cell 67 are in the grid circuit of the vacuum tube 91 so as to vary the plate current of the vacuum tube according to the well-known phenomenon of plate-current control by a grid. When the photo-electric cell is darkened, due to an identity in the digits compared, the plate current or potential applied to the magnet 92 is reduced to cause closure of relay contacts 93.

Figure 8:
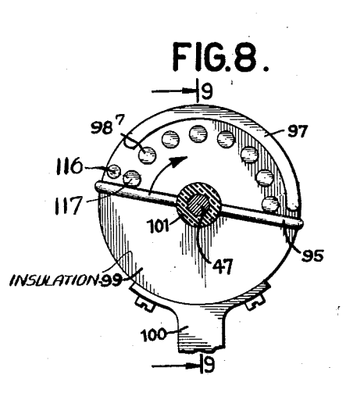
Fig. 8 is a detail view of one of the electric switching mechanisms.
Figure 9:
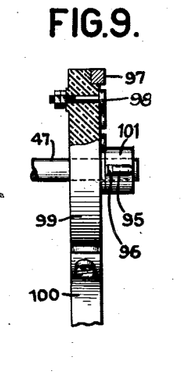
Fig. 9 is a partial sectional view taken on line 9—9 of Fig. 8.

Carried by the shaft 47 is a double switch arm 95 (Figs. 4, 8 and 9) carrying at each end a switch blade 96 one of which at a time is capable of having a continuous engagement with a concentric contact strip 97 for a certain angular movement of the shaft 47 and at the same time with one of a series of seven contact points 98. For the first 180° movement of shaft 47 one switch blade 96 is effective, then for the remaining 180° the other switch blade is effective. The contact strip 97 and contact points 98 are carried by a disk 99 of insulation and supported by a suitable standard 100 and while the switch arm 95 is fixed to shaft 47 it is insulated therefrom by an insulating tube 101.

The contact points 98 correspond in number to the seven orders and are so spaced apart that when one of the digits to be compared is at the first reading line $80_1$, for example, one of the switch blades 96 connects the contact strip 97 with the related switch point $98_1$. When the digit is at the reading line $80_2$ contact point $98_2$ is connected with the contact strip 97, and so on.

Recalling the statement made above, that contacts 93 were closed because the "9" digit of the record, in the third space or order of field III, coincided with the "9" digit of the film, it will be observed that switch element $98_3$ will at that time be electrically connected with contact strip 97 by one of the switch blades 96 and the following circuit connection, with reference to Fig. 14, will be established. From the positive side current is transmitted by a wire 102 through contacts 93 (now closed) and by a wire 103 to the contact strip 97, thence by one of the switch blades 96 to the contact point $98_3$. From each contact point 98 a wire 104 leads to a related relay magnet 105 so that contact $98_3$ by a wire connection 104 effects the energization of a related relay magnet $105_3$ since one side of all magnets 105 leads by a wire 106 to the negative side of the line.

When a magnet 105 is energized an armature 107 (Fig. 16) thereof is rocked about its pivot 108 so that the end opposite the pivot engages an end of a contact blade causing closure of a related pair of contacts 110 and 111 which remain closed until the termination of the machine cycle, such closure being preserved by a holding circuit maintained by contacts 110 and contacts 114, the contacts 114 being normally closed by the spring action of their longer blade.

From the negative side of the line, the holding circuit leads by a wire 106 to magnet $105_3$ thence by wire $112_3$ to contact $110_3$ and since the contacts, in the example assumed are now closed, the circuit leads by wire 113, common to corresponding blades of a series of contacts 110, to contacts 114, now closed. The holding circuit then extends by wire 115 to the positive side of the line, thus maintaining contacts $110_3$ and $111_3$ closed until contacts 114 open after machine operations involving a single card are completed.

As the switch arm 95 continues its movement after contacting the contact point $98_7$ and leaves the contact strip 97, one of the contact blades 96 closes a circuit by two switch points 116 and 117, thus closing a circuit through one of the closed contacts 111, such as $111_3$ for the third order, and thence by a plug connection $119_3$ to a related accumulator magnet $120_3$. There are seven of such magnets 120 provided, one for each order. The circuit from the magnets 120 is extended by a wire 121, jumper or plug connection 122 to the wire 106 which leads to the negative line side, thereby effecting the energization of a magnet 120 if its related contacts 111 are closed. The switch arm 96 and the parts associated therewith constitute selector means for preparing successively the several controlling circuits which include the respective magnets 120. These circuits, although prepared by the engagement of the switch arm 96 with the respective contacts, are normally open owing to the gap at the relay contacts 93. Only when this gap is closed by the action of the photoelectric cell 67, as described above, does the respective prepared controlling circuit become effective to energize its magnet 120. Inasmuch as the switch arm 96 is mounted on the same shaft 47 which controls the movement of the film or comparison member 73, the selector means is operated in synchronism with the movement of said film or movable member 73.

Figure 12:
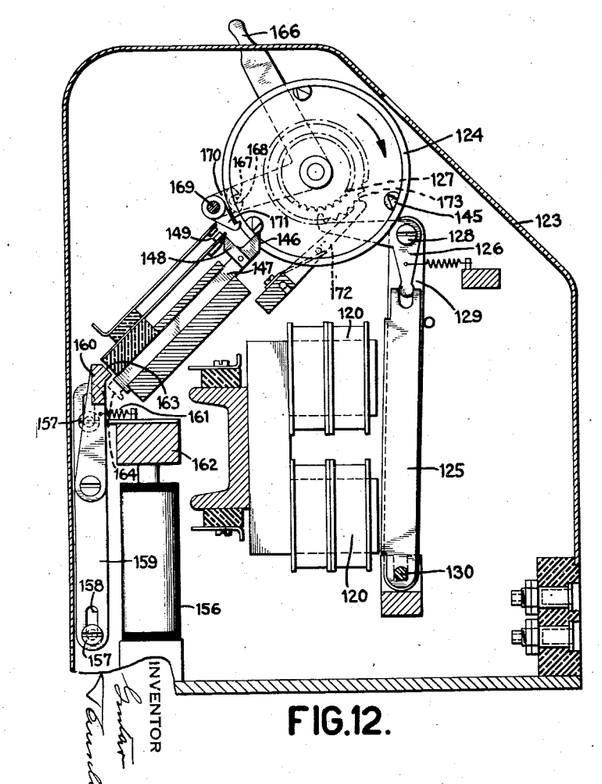
Fig. 12 is a sectional view of one of the accumulators.
Figure 13:
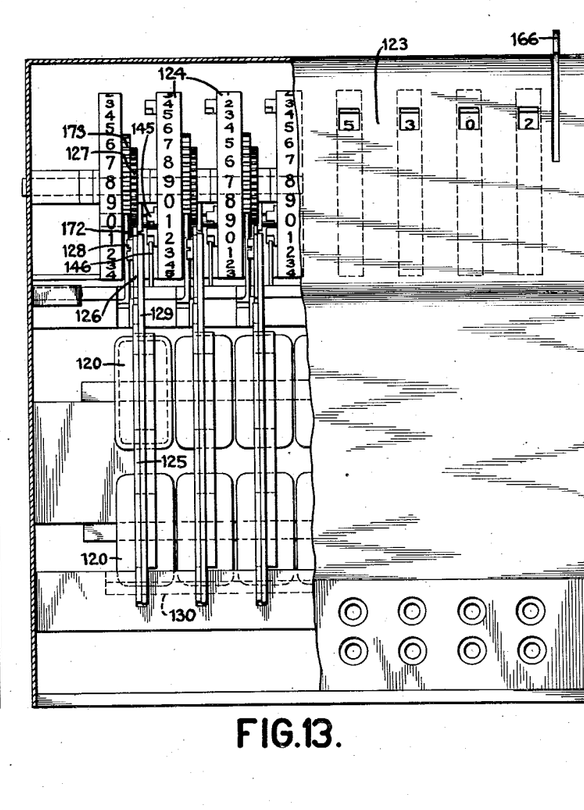
Fig. 13 is a front view of one of the accumulators, part of the enclosing cabinet cut away to show certain parts.

The accumulator 123 is preferably of the type shown in Figs. 12 and 13 and comprises a series of eight accumulator wheels 124, although more or less may be provided depending upon the necessary capacity of the accumulator. Each accumulator wheel constitutes an indicator or indicating device. Assuming that the accumulator magnet 120 shown in Fig. 12 is for the third order it will be clear that when an electrical impulse is directed thereto such magnet will by its energization attract a pivoted armature lever 125 so as to initially rock a bell crank pawl 126 in a clockwise direction (Fig. 12) thereby causing the extremity of the horizontal arm of pawl 126 to engage one of the tooth spaces of a pinion 127 secured to the related accumulator wheel 124. The pawl 126 is pivoted at 128 to an arm 129 which is also pivoted on the rod 130 which also forms the pivot of the lever 125. After the initial rocking of pawl 126 continued movement of lever 125 by the magnet will cause pawl 126 and arm 129 to be shifted to the left to turn pinion 127 an amount equivalent to one tooth space. The mechanism above described for turning an adding wheel is similar to the arrangement in the Tauschek U. S. Patent 1,781,349, dated November 11, 1930 and for this reason is only generally explained. After a wheel is turned its operating mechanism is returned to normal leaving the wheel in its adjusted position.

It is important to understand that while a digit "9" has, in the example assumed, been located in the third order of a number, only one electrical impulse is transmitted during the part of the cycle involving the comparison of the "9" digit on the film with the digit of the record. However, it should be understood that during the next half revolution of shaft 47, when the record is being analyzed for the presence of any "8" digit, contacts 116—117 are again closed, and by contacts $111_3$ which are still closed, another electrical impulse is transmitted to the magnet 120 of the third order. If the wheel previously indicated "1", after having been shifted from "0" to "1", it will now indicate "2". Thereafter, for each succeeding half revolution of shaft 47 involving the comparison of each of the remaining digits on the film such as 7, 6, 5, 4, 3, 2, and 1, with a digit in each denominational order of the number, an electrical impulse will be transmitted to the magnet 120 of the third order to successively turn the related accumulator wheel 124 a sufficient extent to display "9" at the reading line when the record has been completely analyzed. Each of the accumulator wheels 124 also constitutes a denominational manifesting device indicating, by the extent of its movement in each particular case, the magnitude or identity of the character or digit "read" at that moment. It will be noted that in a complete cycle (ten half-revolutions of the shaft 47, bringing the film 73 back to its original position) each of the film digits is compared successively with each of the denominational digits in the corresponding field or section of the record 32. Thus, in the embodiment illustrated, where the field has seven denominational orders or spaces, a film digit, for instance the digit "9", is compared successively with the numbers in each of the seven spaces of the corresponding record field, before the next film digit ("8") is compared with the same numbers in said record field. In order that this result may be accomplished, the spacing of two successive digits on the film 73 corresponds to the width of the corresponding record field (such as I, II, or III).

After the film has been positioned to successively compare the "9" digit thereof with the optical image of the digits of the number 16903, the wheel 70 is given another half turn to thus bring the "8" digit of the film into position and successively compare such digit with the optical image of each digit of the number 16903 but since the "8" does not appear in such number the contacts 93 remain open during such comparing operations, as is likewise true with respect to comparing operations involving the digit "7". However, when the digit "6" of the film appears at the reading line 80₄, the optical image of the digit "6" of the fourth order is imposed upon the digit "6" of the film so that contacts 93 close to effect the closure of contacts 111₄ which cause the transmission of an impulse to the magnet 120 of the fourth order. Thereafter by a series of six impulses the related wheel 124 will advance six steps. In the same manner the wheel of the fifth order is turned to display "1". The wheels 124 normally exhibit zeros due to a previous resetting operation so that the accumulator wheels will exhibit 00016903. Correspondingly, other accumulators by reading units B and C add the numbers in the remaining card fields I and II.

It is pointed out that when contacts 116—117 are closed one or more impulses may be transmitted to one or more magnets 120, respectively, depending upon how many contacts 111 are in closed position. For example, when contacts 111₃ and contacts 111₄ are closed during a closing of contacts 116 and 117, two impulses are transmitted, one to the magnet 120₃ and one to magnet 120₄, as will be understood.

Secured to the shaft 47 is a pinion 131 (Figs. 2 and 4) meshing with a gear 132 loosely mounted on a stud 133, the gear ratio between the pinion and gear being so selected that towards the end of the fifth revolution of shaft 47 a pin 134 on the gear 132 is arranged to contact the longer blade (Fig. 2) of contacts 114 to open the same. Referring to Fig. 14 it will be observed that the opening of such contacts will open the circuits to all the magnets 105 which have been previously energized and held energized due to the closing of their related circuit holding contacts 110. As magnets 105 are now deenergized their related contacts 111 and 110 are restored to open positions. Contacts 114 are open while one of the switch blades 96 closes contacts 116—117 during the last half revolution of shaft 47. This prevents the transmission of an electrical impulse to the selected magnets 120 during this part of the cycle. During this last half-revolution of shaft 47, the film portion in the path of the rays is the one corresponding to zero, and this film portion is preferably left blank (although it might bear the digit "0"), since it is not intended to have any of the accumulator wheels 124 operated during such last half-revolution of the shaft 47.

Referring now to Fig. 14 it will be observed that contacts 135 are shunted across the circuit which includes magnet 92 and the usual "B" battery and to understand the purpose of such contacts it is explained that a digit of the film is preferably rapidly advanced to the reading line and then shifted past said reading line in a retarded motion. This is due to the construction shown in Fig. 7 where it will be observed that as the pin 45 is in engagement with a slot 48, as shown, a rotary movement of shaft 42 will turn the shaft 47 quickly followed by a decreasing acceleration, the movement being retarded as the slot 48 recedes from the center of shaft 42, the slot becoming closer to an arcuate path with the shaft 42 as a center. Therefore, by suitably normally positioning the digit of a film with respect to the reading lines the digit may be shifted rapidly towards and away from the reading line but in a retarded movement while over such line to greatly extend the time of comparison with the optical image of a digit which is also shifted by a similar relatively slow movement.

Figure 10:
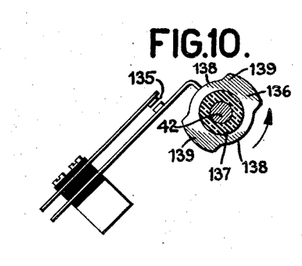
Fig. 10 is a detail view of one of the cams and controlling contacts.

A cam 136 (Fig. 10) which controls contacts 135 is securely fixed so as to be movable with the supporting shaft 42 but insulated therefrom by an insulating tube 137. The cam is of double formation and has opposite concentric portions 138 which permit the opening of contacts 135 and are effective while the digit in the film is receiving a retarded or slowed down movement for greater efficiency in comparison operation. While the film is receiving an accelerated movement either one or the other of the cam portions 139 is effective to cause closure of contacts 135 thus causing a high voltage from the "B" battery to energize magnet 92 thus insuring of opening of contacts 93 if they were previously closed. Contacts 135 are, therefore, opened each time when the digits are to be compared and closed each time when the digits are shifted from one reading line to the other. The above arrangement insures more successful comparisons by insuring opening of contacts 93 before a comparing operation and thereby increases the accuracy and speed of the machine.

It has been previously stated that there are provided three light controlled digit reading units A, B and C, respectively, associated with card fields I, II, and III.

They are constructed alike and to provide suitable driving connections from the shaft 47 to the film drive for reading unit B there is secured to shaft 47 a gear 140 (Fig. 4) adapted, through an idler pinion 141, to drive a gear 142 which effects the same operation as described for reading unit A. By means of an idler pinion 143 a gear 144 of the reading unit C is driven.

Referring to Fig. 4 it will be observed that the cam 136 is sufficiently broad to operate three sets of contacts 135, one for each electric control unit D, E and F (Fig. 14).

There is only one set of contacts 114 provided for the three electrical control units as the single set of contacts may control the deenergization of all the magnets 105 of each of the three units so that the three accumulators may individually totalize numbers represented upon the associated controlling fields of the record.

It is well known that it is necessary that when a particular accumulator wheel passes through zero, the wheel of the next order be turned an extra step to effect the necessary transfers. Any suitable mechanism may be provided to carry out the above and in the preferred embodiment may comprise the following arrangement.

Referring to Fig. 12 it will be observed that secured to the side of a wheel 124 are three equidistantly spaced transfer projections 145, there being three since the figures on the wheel 124 constitute three sets. When a wheel passes from "9" to "0" one of the transfer projections engages the diagonal edge 146 of a slide member 147 which, by a cam edge of a lug extension 148 of member 147 is adapted to close transfer contacts 149. The purpose of such contacts is more evident from the wiring diagram where it will be observed that from a line wire 150 a circuit is closed through one of such closed transfer contacts 149 to the accumulator magnet 120 of the next higher order by means of a related wire connection 151. While one or more contacts 149 may be closed during an accumulating operation, transfers are not effected until the completion of the accumulating operations and are controlled by contacts 152 which are connected to control all three accumulators. Such contacts are also shown in Fig. 2 wherein it will be observed that when pin 134 engages the center blade to open contact 114 it closes contacts 152. In so doing a connection is effected from the positive side of the line by wire 115 (Fig. 14), through closed contacts 152, wire 153, jumper connection 154 to one side of each of the contacts 149 by wire 150. A circuit thus leads to the higher order magnet 120 dependent upon the previous closing of contacts 149 by a wheel of lower order. The circuit to the negative line side is completed by wire 121, jumper 122 and wire 106.

When an accumulator magnet is energized it causes operation of its related pawl 126 to turn the higher order wheel one step. If such a wheel stood at nine and received a transfer from the lower order wheel that wheel will pass through zero and in so doing will close its related contacts 149 to effect a transfer to the wheel of next higher order. Such transfer operations are known as transfers by transfers, and the present arrangement takes care of such requirements.

When contacts 152 close an impulse is also directed to a magnet 156 (Figs. 12 and 14) which is provided to restore the shifted slides 147 to normal by mechanism generally described herein as it is shown in more complete detail in the British patent 372,742.

Slidably mounted by pins 157 engaging slots 158 are a pair of slides 159 to which is pivotally connected a crossbar 160 which is urged by a spring 161. When magnet 156 is energized an armature structure 162 is effective to pull down both slides 159 since the armature is carried and fixedly held between said slides. Bar 160 will now be lowered without affecting the position of any slide 147 which may be in the shifted or lower position, bringing however, the inclined edge 163 of the bar 160 directly against the edge 164 of any shifted slide.

When magnet 156 is deenergized by opening of contacts 152 a suitable spring may elevate bar 160 and by the contact of the edges 163 and 164 a thrust will be effected in the direction of movement of a slide 147 thereby restoring the same to its normal position and permitting the opening of the related transfer contacts 149.

Each accumulator is provided with an arrangement more fully disclosed in the British patent 372,742 by which the wheels 124 thereof may be rotated by hand to zero. For this object a bell crank lever 166 is turned for approximately 120° in the arrow direction (Fig. 12) and by means of a pin 167 carried by one arm of the bell crank 166 engaging an open slot in arm 168 secured to a shaft 169, the latter is rocked. The shaft 169 is supported by a pair of arms 170 which are pivoted on the same shaft as the lever 166. Thus if the lever 166 is turned in the arrow direction the pin 167 turns the arm 168 and thus shaft 169. A series of hooks 171° are carried by shaft 169, one for each wheel 124, so that rocking of shaft 169 will rock hooks 171 to such an extent that they will catch under the transfer projections 145, in their various positions of displacement and turn the wheels clockwise during the further movement of lever 165 until the accumulator wheels are in their zero position, at which times they are impositively held in such position by pawls 172 engaging ratchet wheels 173 attached to each accumulator wheel 124. After this the lever 166 is again returned to normal.

It will be recalled that the digits are preferably demarcated on film 73 (Fig. 11) by opaque portions surrounded by translucent lines. The reason for such will now be explained.

By practice, it has been found that when characters are typed on a record by the usual inking ribbons on typewriters the bodies of such characters, if magnified, will be found to be nonuniform in their properties as regards modifying light, since the bodies of such characters consist of outlines considerably darker than the interior portions, substantially complementary to the digits shown in Fig. 11. This is probably due to the sharp type edges shifting the moist ink of the ribbon. Since the central portions are light and the edges contrastingly dark (see Fig. 17) the digits on the film 73 must be complementary to secure absolute comparison.

The above is not an indispensable feature since if the characters on a record are uniform in the lines representing such characters, the characters on the film would be, in the system disclosed, all translucent or transparent and the surrounding area opaque.

While the embodiments illustrated employ light controlled means it is further contemplated to arrive at the same result by employing other rays of radiant energy; such as heat, ultra-violet, X-rays, and other rays of electro-magnetic character, etc., for the controlling medium and the term "light" is not to be construed as restrictive. For instance, the portion of the spectrum known as the infra-red spectrum may be used, it being understood that in each case there would be employed a proper apparatus sensitive to the type of radiant energy used; in the embodiment illustrated, where ordinary light is presumed to be employed, photoelectric cells are used; it will be obvious to men skilled in the art what devices they are to substitute for the photoelectric cell when employing radiant energy of other character.

What is claimed is as follows:

1. In a reading machine for a record bearing ordered characters thereon, a member bearing comparing character thereon, means for comparing each of said ordered characters with a comparing character and then with successive comparing characters, means responsive to the comparison of like characters, and means controlled thereby to indicate compared like characters in the order in which they appear on said record.

2. In an indicating machine having a record which bears, characters thereon and means for producing a beam of light; a comparing means comprising means for directing said beam of light against said record to illuminate said record and characters, and a reading unit having a movable comparing member, said unit being responsive to the reflected illumination of said record, a plurality of indicating devices, means to move said comparing member, means to move said directing means to cause said beam to traverse said record characters in synchronism with said first-named moving means, and means controlled by said comparing means to operate said indicating devices in synchronism with both of said moving means.

3. In a machine for reading a record having a plurality of aligned characters together constituting a single representation, a reading unit comprising a radiant energy responsive means and a character bearing search member for successively comparing each record character with each character on the search member, a plurality of indicating devices, one for each character position on the record, and operating means therefor, and means controlled by the reading unit upon determining the identity of each record character with a character on the search member for causing the operating means to set up the record characters on the correspondingly positioned indicating devices.

4. In a machine of the class described, controlled by a record having a plurality of characters thereon, an endless flexible search member bearing a set of all the different characters that may appear on such record, means whereby a portion of said search member will be held substantially flat, means for projecting by radiant energy upon said flat portion of the search member an image of the several characters appearing on said record, means for moving said search member lengthwise to bring each of the characters thereon successively into cooperative relation to the image of a character on the record, and means sensitive to said radiant energy adjacent said search member for determining when correspondence exists between a character on the search member and the image of the record character which is projected on the search member.

5. In a reading machine for a record bearing ordered characters, a reading device, and a plurality of indicating devices, said reading device comprising means for comparing each of said ordered characters with a comparing character in said reading device and movable to different positions with respect to the position of said ordered characters and means responsive to the comparison of like characters, a holding circuit for each indicating device, means for preparing each holding circuit in synchronism with the comparison of the corresponding ordered character, and means controlled by said responsive means for completing the prepared holding circuit upon the comparison of like characters.

6. In a reading machine for a record bearing ordered characters thereon, a member bearing comparing characters thereon, means for comparing each of said ordered characters with a comparing character and then with successive comparing characters, means responsive to the comparison of like characters, an indicating device for each ordered character, circuit controlling means controlled by said responsive means, and means operable in synchronism with the comparison of said characters for placing said indicating devices under control of said circuit controlling means.

GUSTAV TAUSCHEK.